United States Patent
Nusret

(10) Patent No.: US 8,382,137 B2
(45) Date of Patent: Feb. 26, 2013

(54) MOTORCYCLE BACKREST WITH EXTENSION SIGNAL LIGHTS

(76) Inventor: Michael Nusret, South Elgin, IL (US)

(*) Notice: Subject to any disclaimer, the term of this patent is extended or adjusted under 35 U.S.C. 154(b) by 234 days.

(21) Appl. No.: 12/877,867

(22) Filed: Sep. 8, 2010

(65) Prior Publication Data

US 2012/0056454 A1 Mar. 8, 2012

(51) Int. Cl.
*B62J 1/28* (2006.01)

(52) U.S. Cl. .............. 280/288.4; 280/304.4; 362/473; 297/352

(58) Field of Classification Search ............ 297/215.1, 297/215.11, 215.12, 230.1, 230.13, 352; 280/288.4, 304.4; 362/473; 340/465
See application file for complete search history.

(56) References Cited

U.S. PATENT DOCUMENTS

| | | | | |
|---|---|---|---|---|
| 3,486,767 A * | 12/1969 | Lujan | | 280/304.4 |
| 3,574,396 A * | 4/1971 | Bird | | 297/215.11 |
| 3,741,596 A * | 6/1973 | Cate | | 297/215.11 |
| 3,853,351 A * | 12/1974 | Lassiter | | 297/452.48 |
| 3,899,209 A * | 8/1975 | Schulz | | 297/383 |
| 4,095,820 A * | 6/1978 | Hanagan | | 224/275 |
| 4,111,448 A * | 9/1978 | Sklodowsky | | 280/304.4 |
| 4,186,937 A * | 2/1980 | Schultz | | 280/304.4 |
| 4,394,783 A * | 7/1983 | Simmons | | 297/230.1 |
| 4,466,660 A * | 8/1984 | Mabie | | 297/215.11 |
| RE33,178 E * | 3/1990 | Ahlberg | | 280/801.2 |
| 5,588,698 A * | 12/1996 | Hsueh | | 297/184.11 |
| 6,073,948 A * | 6/2000 | Motojima et al. | | 280/152.2 |
| 6,299,248 B1 * | 10/2001 | Gennaro et al. | | 297/230.13 |
| 6,347,804 B1 * | 2/2002 | Seibel | | 280/288.4 |
| 6,652,027 B1 * | 11/2003 | Pardonnet | | 297/230.12 |
| 6,991,290 B1 * | 1/2006 | Wiertzema | | 297/230.1 |
| 7,000,985 B2 * | 2/2006 | Belgarde | | 297/255 |
| 7,021,708 B2 * | 4/2006 | Renner | | 297/230.1 |
| 7,073,854 B2 * | 7/2006 | Tseng | | 297/215.12 |
| 2003/0025290 A1 * | 2/2003 | McCann | | 280/202 |
| 2004/0108347 A1 * | 6/2004 | James | | 224/413 |
| 2005/0275268 A1 * | 12/2005 | Oomori | | 297/352 |
| 2009/0184507 A1 * | 7/2009 | Leisch | | 280/770 |

* cited by examiner

*Primary Examiner* — Anne Marie Boehler
*Assistant Examiner* — Maurice Williams
(74) *Attorney, Agent, or Firm* — Sinorica, LLC

(57) ABSTRACT

A motorcycle backrest with an integrated lighting system that can be connected to a motorcycle's existing lighting system. The motorcycle back rest additionally comprises of a protective cover with cushioning to protect any unique designs or paint applied to the motorcycle back rest frame. The lighting system can increase visibility of motorcyclist and may prevent any potential accidents. The lighting system implements a dim, bright, and flashing system to indicate that the motorcycle is either running, braking, or signaling for a turn.

18 Claims, 8 Drawing Sheets

MOTORCYCLE BACKREST WITH EXTENSION SIGNAL LIGHTS

FIELD OF THE INVENTION

The present invention relates generally to motor cycle back rest with integrated signal lights. It is the objective of the present invention to provide a user with a unique back rest with integrated signal light extensions.

BACKGROUND OF THE INVENTION

Traditionally, motorcyclists ride their motorcycles without the back rest. For users who wish to use a back rest, attachment methods are available. These motorcycle back rests provide users a structure at the back of their motorcycle seats that allow the users to sit back on their seats while riding. The present invention introduces a new type of motor cycle back rest that also comprises of an integrated lighting system for signaling. The user will be able to attach the present invention onto their motorcycle seats along with an extension to for the signaling system. The increased visibility will help prevent potential collisions or accidents that may occur. The traditional motorcycle back rest does not comprise of an extension lighting system for attaching to a motorcycle's original back lighting system. The present invention contributes to the aesthetics of a motorcycle and increases visibility of the rider.

DETAIL DESCRIPTIONS OF THE INVENTION

Figure 1:
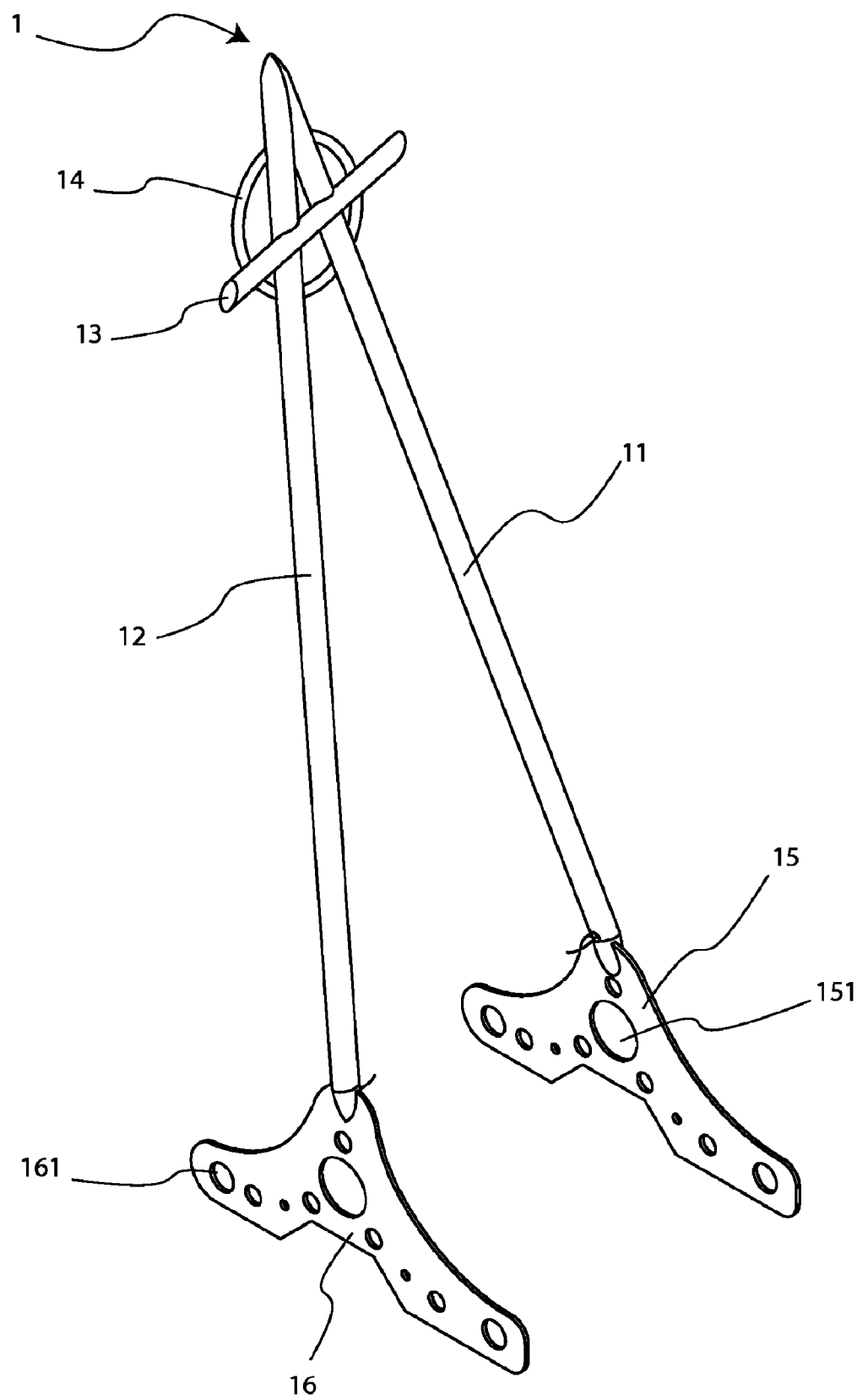
FIG. 1 is a perspective view of the back rest frame of the present invention.
Figure 2:
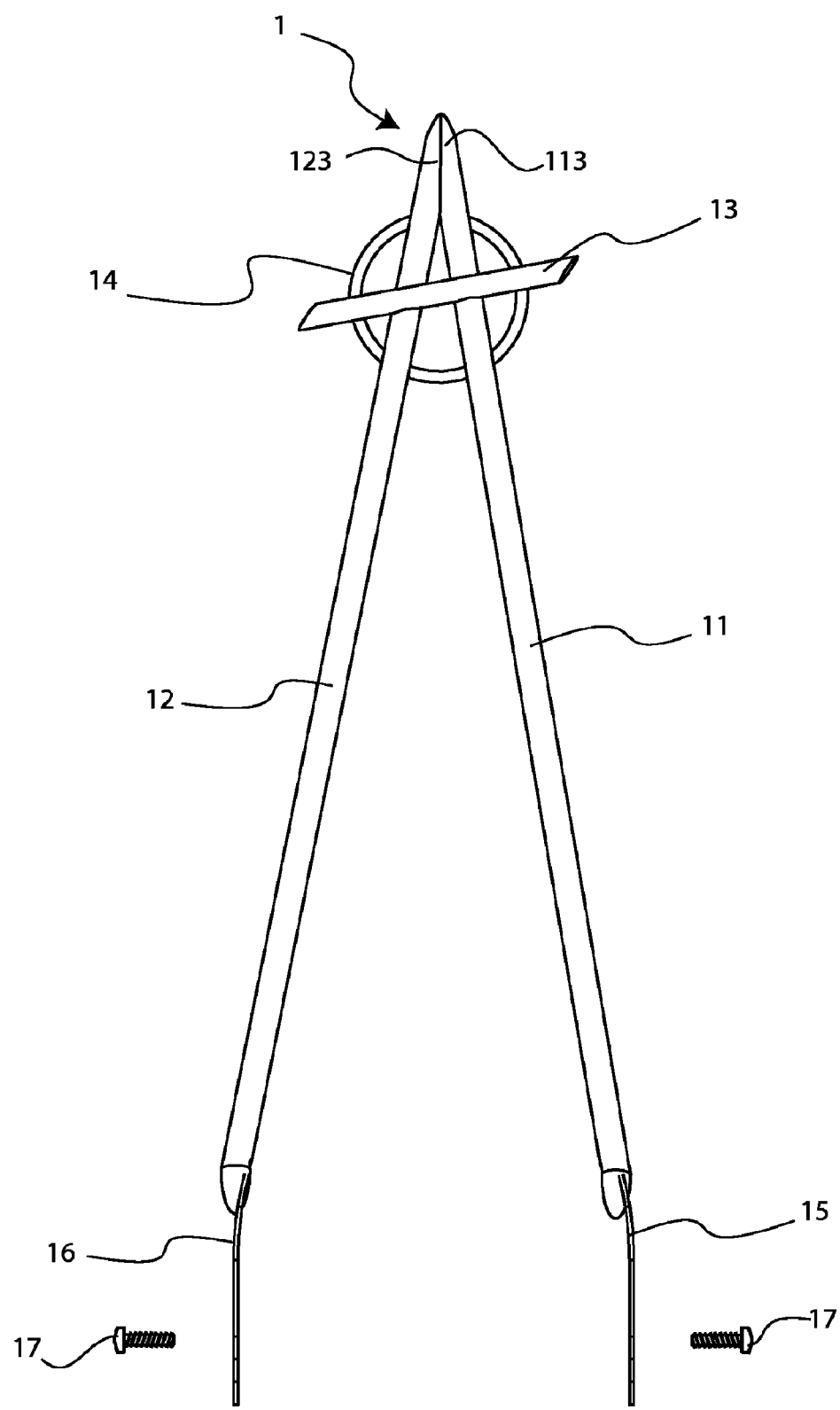
FIG. 2 is a front elevational view of the back rest frame of the present invention with the mount fasteners.
Figure 3:
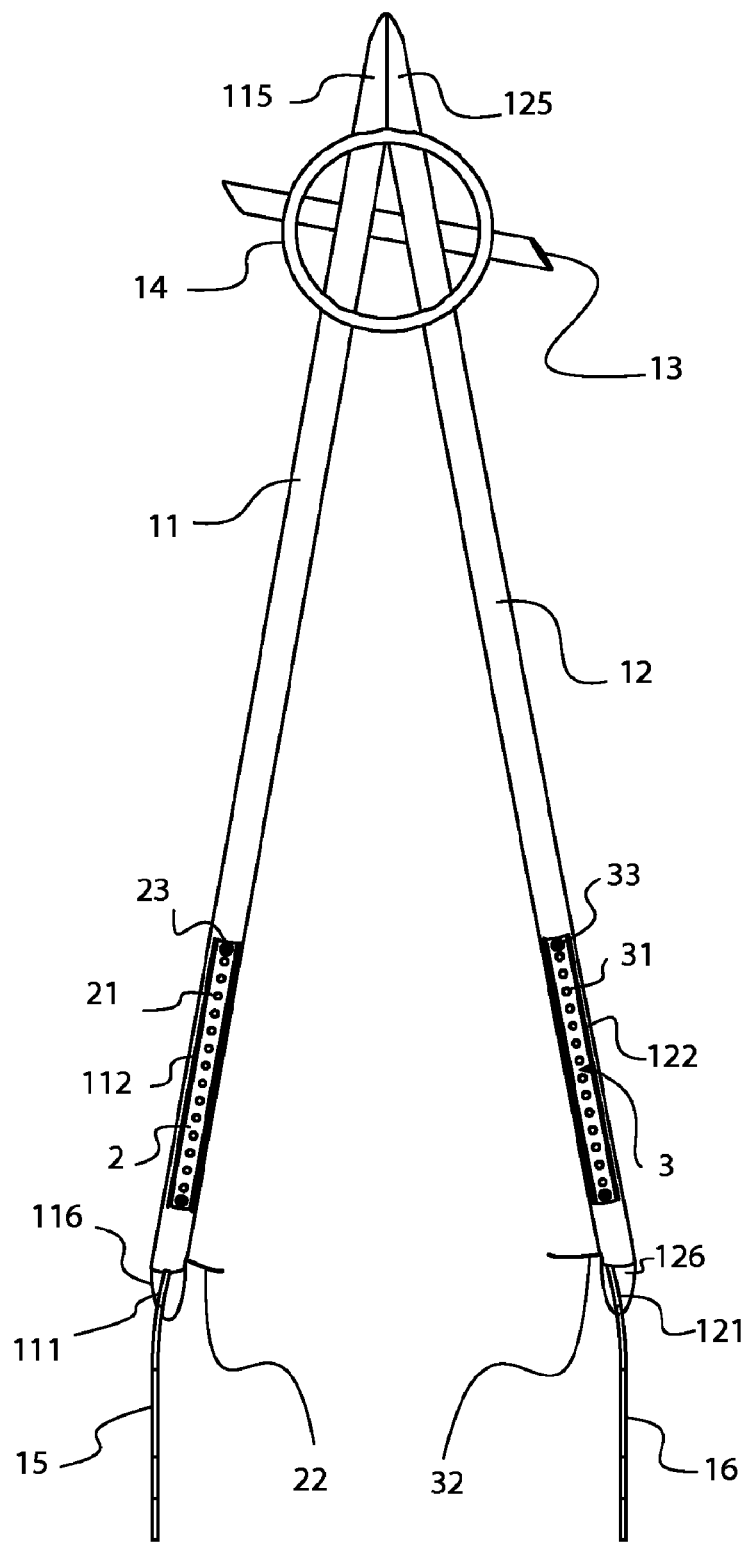
FIG. 3 is a rear elevational view of the back rest frame of the present invention.

All illustrations of the drawings are for the purpose of describing selected versions of the present invention and are not intended to limit the scope of the present invention.

The present invention is an attachment motorcycle back rest. The attachment motorcycle back rest comprises of a back seat frame 1, a left signal strip 2, a right signal strip 3, and a protective cover 4. The back seat frame 1 serves as structural support of the present invention and allows the user to lean back while riding on the motorcycle. The left signal strip 2 and the right signal strip 3 are extensions that can be connected to a motorcycle's original signaling system for increased visibility. The protective cover 4 serves to protect the present invention from scratches and impact damages.

In reference to FIG. 1, FIG. 2, FIG. 3, FIG. 6, and FIG. 9, the back seat frame 1 comprises a left frame bar 11, a right frame bar 12, a center cross bar 13, a circle frame bar 14, a left mount 15, a right mount 16, and at least one mount fastener 17. The left frame bar 11, the right frame bar 12, the center cross bar 13, and the circle frame bar 14 are tubular bars made of a material selected from the group consisting of aluminum, steel, or other suitable material. The left frame bar 11 comprises a left mount slot 111, a milled left signal slot 112, a left bar angled end 113, a left hollow interior 114, a left first end 115, and a left second end 116. The right frame bar 12 comprises a right mount slot 121, a milled right signal slot 122, a right bar angled end 123, a right hollow interior 124, a right first end 125, and a right second end 126. The left first end 115 is the top end of the left frame bar 11 and the left second end 116 is the bottom end of the left frame bar 11. The right first end 125 is the top end of the right frame bar 12 and the right second end 126 is the bottom end of the right frame bar 12. The left angled end is located on the left frame bar 11 at the left first end 115. The right angled end is located on the right frame bar 12 at the right first end 125. The left frame bar 11 is connected to the right frame bar 12 at by welding the left bar angled end 113 and the right bar angled end 123 together. The right bar angled end 123 and the left bar angled end 113 connect together to form pointed tip. The left frame bar 11 and the right frame bar 12 are slightly milled on the front side. The center cross bar 13 is also slightly milled at two points where it is connected to the left frame bar 11 and the right frame bar 12. The center cross bar 13 is then connected across the left frame bar 11 and the right frame bar 12 where it is milled. The milling of the left frame bar 11, the right frame bar 12, and the center cross bar 13 allow a more recessed fit. The center cross bar 13 is welded to the left frame bar 11 and the right frame bar 12 for a permanent and stable connection. The left frame bar 11, the right frame bar 12, and the center cross bar 13 together form an A-shaped frame for the back seat frame 1. On the rear side of the back seat frame 1 opposite of the center cross bar 13 is positioned the circle frame bar 14. Similar to the center cross bar 13, the left frame bar 11 and the right frame bar 12 are slightly milled on the rear side for connection to the circle frame bar 14. The circle frame bar 14 is also slightly milled at the points where it is connected to the left frame bar 11 and the right frame bar 12. The circle frame bar 14 is evenly connected and welded across the left frame bar 11 and right frame bar 12. The left frame bar 11, the right frame bar 12, the center cross bar 13, and the circle frame bar 14 can be customized to possess any look or design the user desires. This can include giving the back seat frame 1 a wooden look, a glossy look, a metallic look, a look with patterns, or even customized to have fake blood stains. These designs can be painted or air brushed onto the back seat frame 1 to increase the aesthetics of the present invention.

In reference to FIG. 1, FIG. 2, FIG. 3, and FIG. 5, the left mount slot 111 is a thin gap located at the left second end 116 of the left frame bar 11. The left mount 15 is inserted into the left mount slot 111 and welded for a permanent stable bond to the left frame bar 11. The right mount slot 121 is a thin gap located at the right second end 126 of the right frame bar 12. The right mount 16 is inserted into the right mount slot 121 and welded for a permanent stable bond to the right frame bar 12. The left mount 15 comprises at least one left mount hole 151. The right mount 16 comprises at least one right mount hole 161. The left mount 15 and the right mount 16 are used by the user to connect the present invention to the back of the seat of a motorcycle. The user can secure the present invention onto their motorcycle by fastening the at least one mount fastener 17 through the at least one left mount hole 151 and the at least one right mount hole 161. The left mount 15 and the right mount 16 can have a plurality of left mount holes and right mount holes for increased versatility. This enables the present invention to be used on any type of motorcycle which may have different configuration of mount holes for fastening a back rest.

Figure 5:
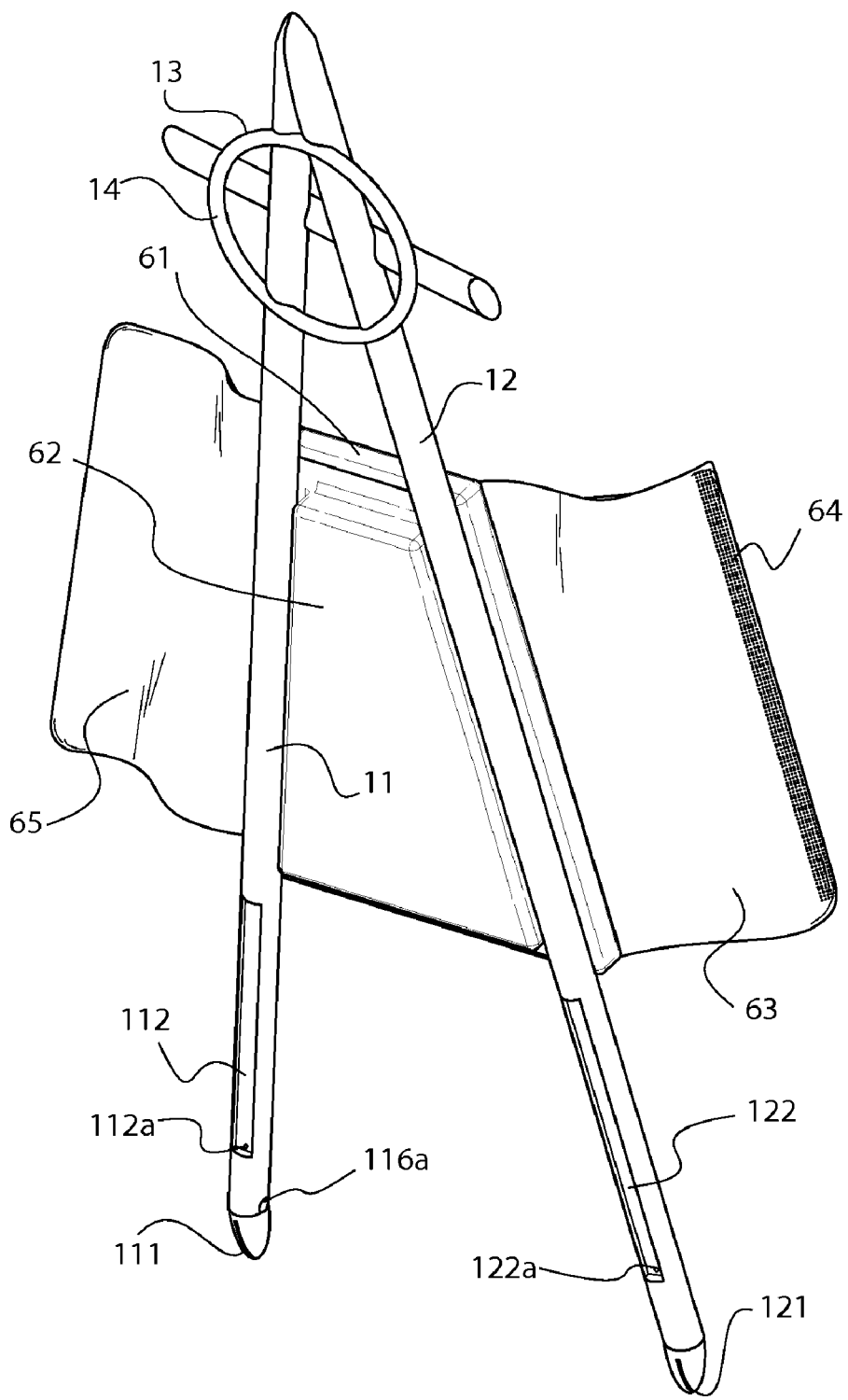
FIG. 5 is a rear view of the present invention without the left mount, the right mount, the left signal strip, and the right signal strip. The protective cover is show with an open right flap and an open left flap. Additionally, the left connector hole and the right connector hole are exposed.
Figure 6:
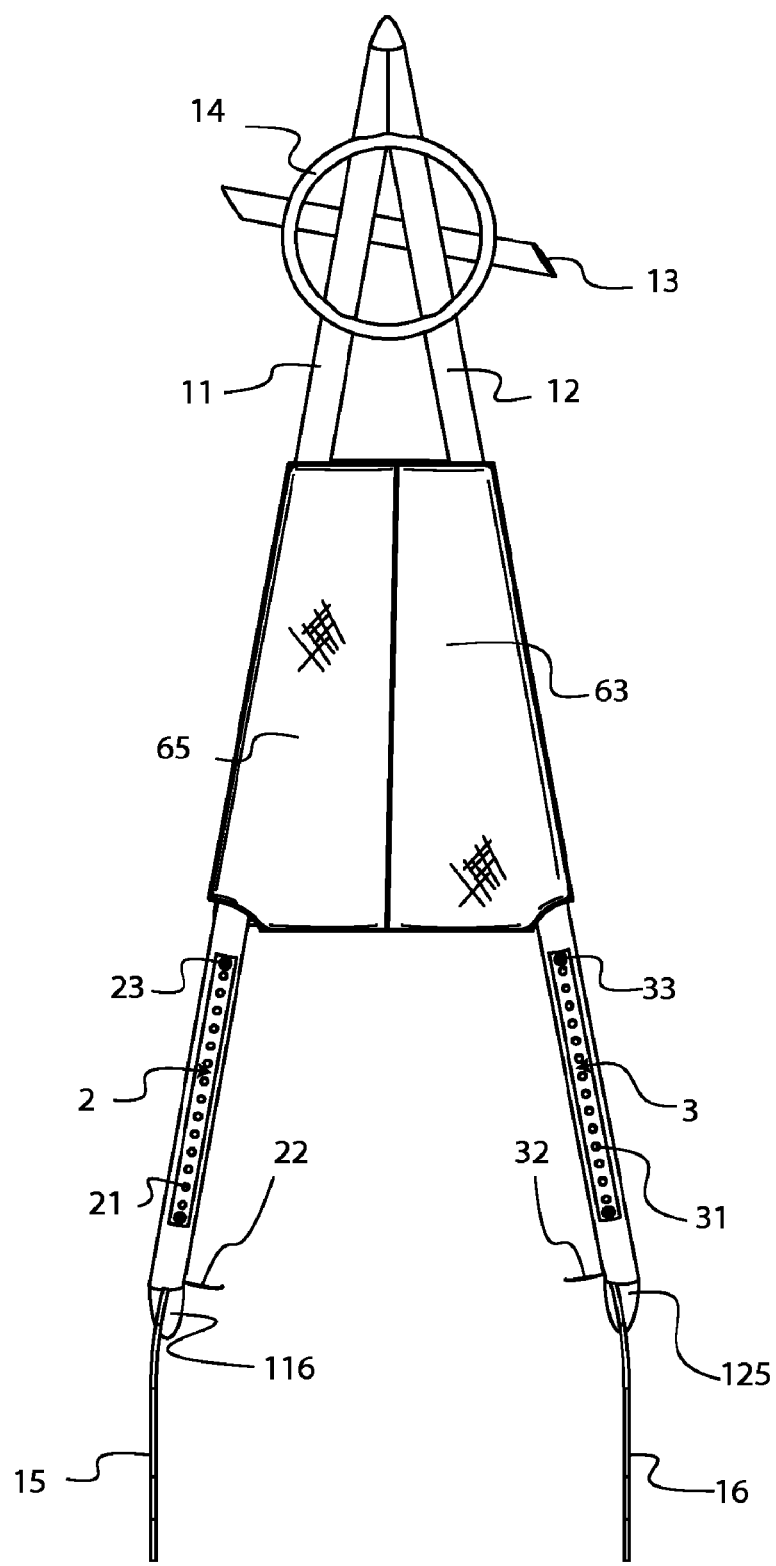
FIG. 6 is a rear elevational view of the present invention with the protective cover in a closed state.
Figure 7:
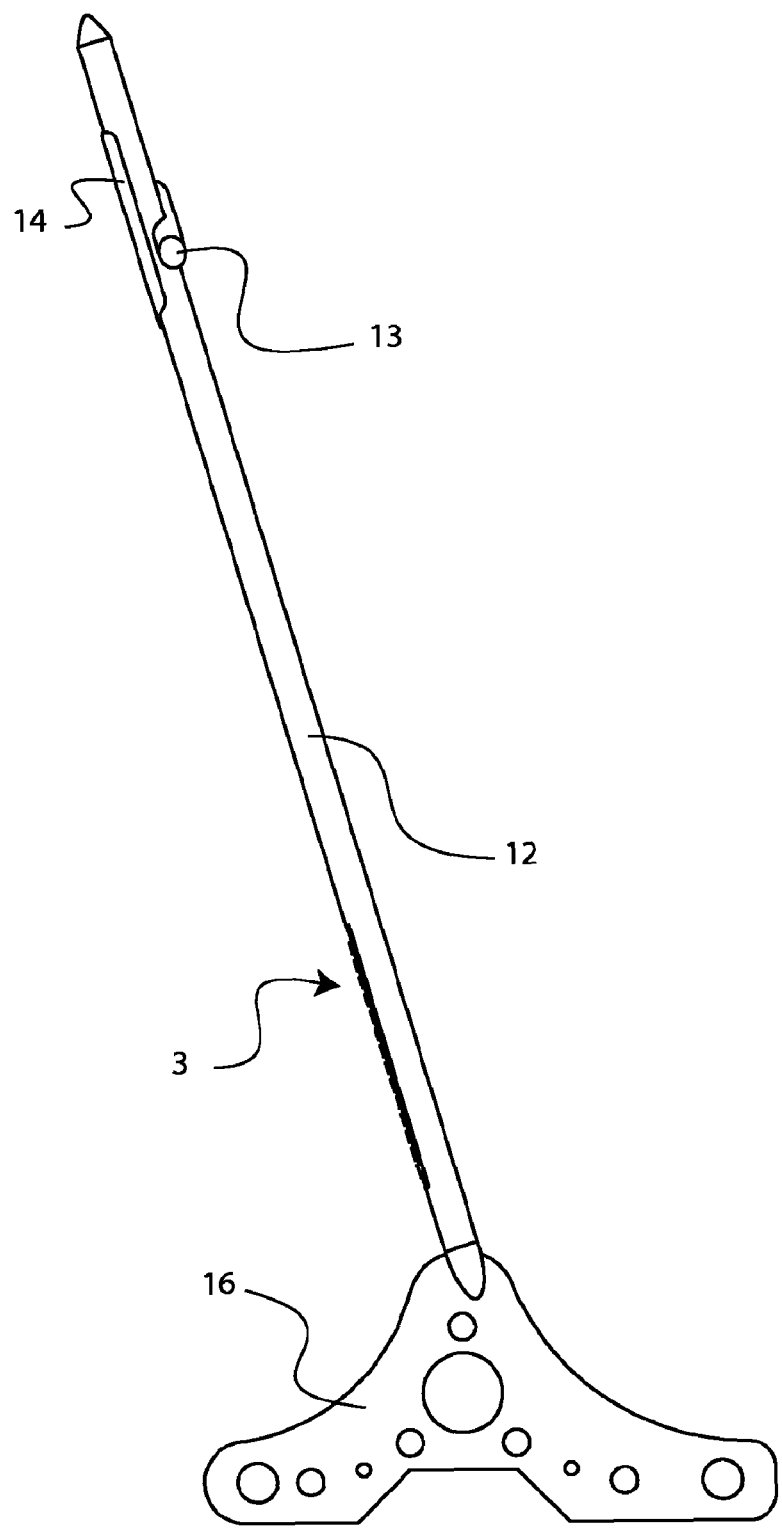
FIG. 7 is a left side view of the present invention without the protective cover.
Figure 8:
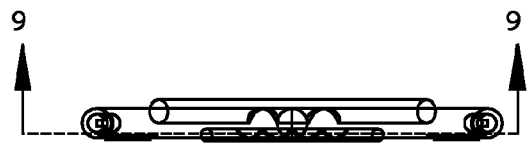
FIG. 8 is top plan view of the present invention showing a plane upon which a section view is taken and shown in FIG. 9.
Figure 9:
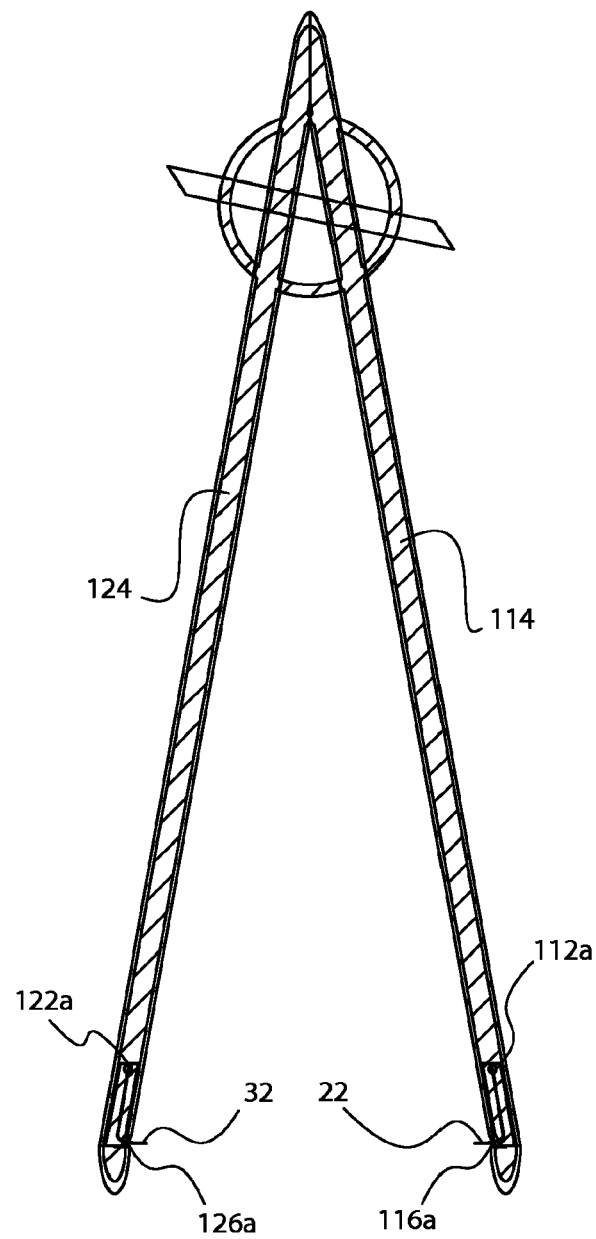
FIG. 9 is a rear elevational view of the back rest frame. The diagram shows the left signal connecting wire and the right signal connecting wire being pulled into the left hollow interior and the right hollow interior, respectively. The wires then travel down their respective frame bar and are pulled out from the left hole and the right hole.

In reference to FIG. 5, FIG. 6, and FIG. 9, the milled left signal slot 112 is an indentation along the length of the rear side of the left frame bar 11 under the circle frame bar 14. The left signal strip 2 is inserted and positioned in a parallel relationship in the milled left signal slot 112. The left signal strip 2 comprises of at least one left LED 21, a left signal connecting wire 22, and a left signal fastener 23. The left signal strip 2 is fastened and stabilized in place by the left signal fastener 23. The left signal fastener 23 can be a fastener selected from the group consisting of bolts, adhesives, clamps, or any other suitable method of fastening. In the preferred embodiment of the present invention, the left signal strip 2 is fastened down by two screws at the top and the bottom. The milled right signal slot 122 is an indentation along the length of the rear side of the right frame bar 12 under the circle frame bar 14. The right signal strip 3 is inserted and positioned in a parallel relationship in the milled right signal slot 122. The right signal strip 3 comprises of at least one right LED 31, a right signal connecting wire 32, and a right signal fastener 33. The right signal strip 3 is fastened and stabilized in place by the right signal fastener 33. The right signal fastener 33 can be a fastener selected from the group consisting of bolts, adhesives, clamps, or any other suitable method of fastening. In the preferred embodiment of the present invention, the right signal strip 3 is fastened down by two screws at the top and the bottom. The left signal strip 2 makes use of the at least one left LED 21 to illuminate the signal for notifying other vehicles. The at least one left LED 21 is connected to the motorcycle's original left signal be the left signal connecting wire 22. To keep the left signal connecting wire 22 out of plain view, the milled left signal slot 112 comprises of a left connector hole 112a and the left second end 116 comprises of the left hole 116a. The left connector hole 112a and the left hole 116a are both holes leading into the left hollow interior 114. The left signal connecting wire 22 is inserted into the left hollow interior 114 of the left frame bar 11 through the left connector hole 112a. The left hollow interior 114 is the space within and along the length of the left frame bar 11. The left signal connecting wire 22 protrudes out from the left hole 116a by at the left second end 116 by the left mount 15 where it can access the original circuitry of the motorcycle's left signal. The right signal strip 3 makes use of the at least one right LED 31 to illuminate the signal for notifying other vehicles. The at least one right LED 31 is connected to the motorcycle's original right signal be the right signal connecting wire 32. To keep the right signal connecting wire 32 out of plain view, the milled right signal slot 122 comprises of a right connector hole 122a and the right second end 126 comprises of the right hole 126a. The right connector hole 122a and the right hole 126a are both holes leading into the right hollow interior 124. The right signal connecting wire 32 is inserted into the right hollow interior 124 of the right frame bar 12 through the right connector hole 122a. The right hollow interior 124 is the space within and along the length of the right frame bar 12. The right signal connecting wire 32 protrudes out from the right hole 126a by at the right second end 126 by the right mount 16 where it can access the original circuitry of the motorcycle's right signal. The left signal strip 2 and the right signal strip 3 acts as an extension for a motorcycle's existing signal lights to provide additional visibility and can help prevent ant potential accidents on the road. The left signal strip 2 and the right signal strip 3 can be utilized to represent running lights, brake lights, and turning signal lights. This can be done by allowing dim lights to represent running lights, bright lights to represent breaking, and flashing bright lights to represent turn signaling.

Figure 4:
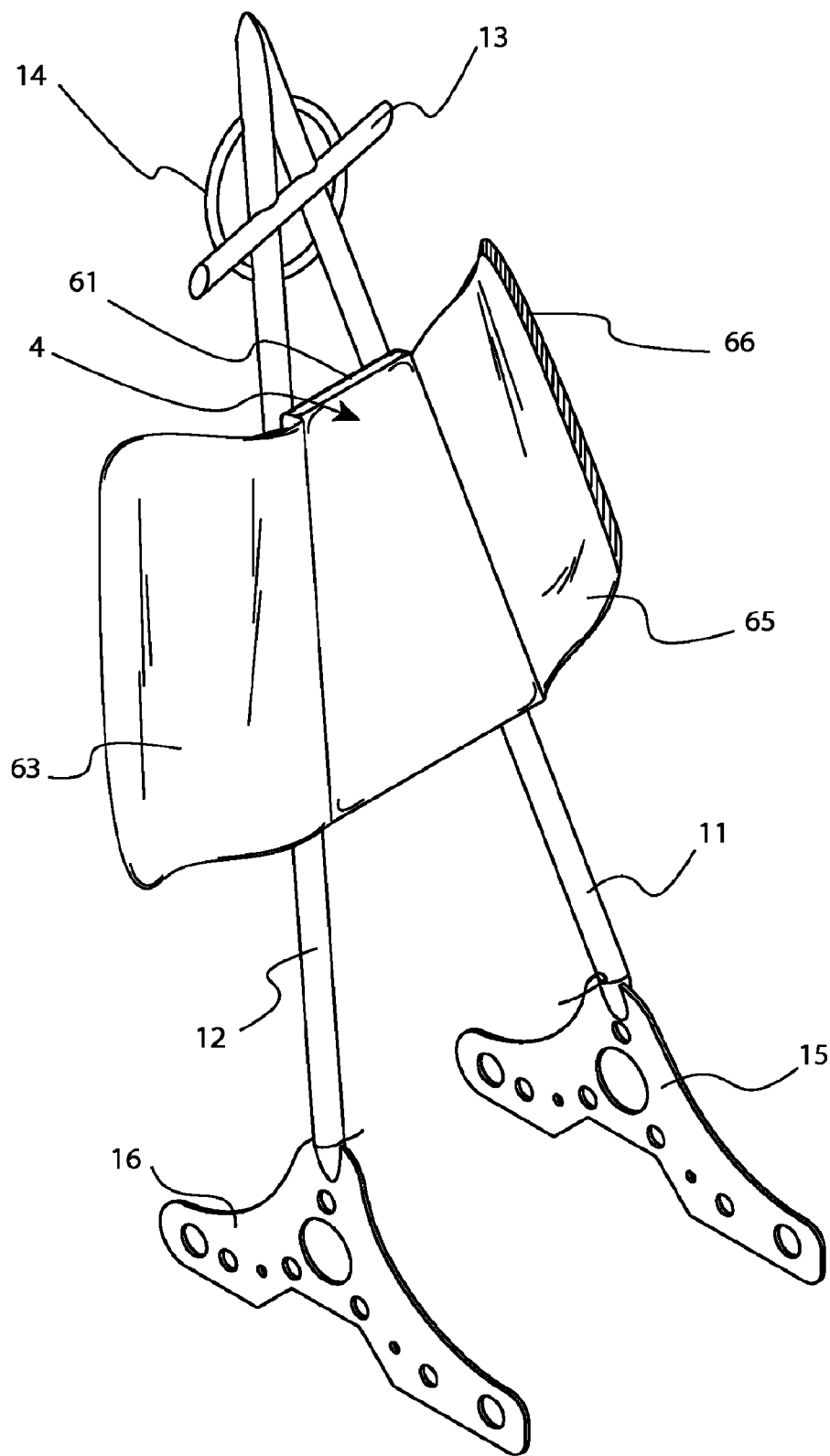
FIG. 4 is a perspective view of the present invention with the protective cover having an open right flap and an open left flap.

In reference to FIG. 4, FIG. 5, and FIG. 6, the protective cover 4 comprises of a cushion 41, an insert cushion 42, a right flap 43, a right male fastener 44, a left flap 45, and a left female fastener 46. The protective cover 4 is a large piece of textile material that is able to cover the back seat frame 1 for protective purposes. The cushion 41 is connected to the center of the inside surface of the protective cover 4. The insert cushion 42 is smaller and connects to the center of the cushion 41. Both the cushion 41 and the insert cushion 42 are trapezoid shaped corresponding to a portion of the back seat frame 1. The insert cushion 42 and the cushion 41 are used to damper and prevent any damage to the back seat frame 1 due to impact. However, it can also double as a pad for the user to rest on while riding on the motorcycle. The protective cover 4 is attached to the back seat frame 1 by inserting the insert cushion 42 between the left frame bar 11 and the right frame bar 12 from the front side. With the insert cushion 42 inserted, the cushion 41 lies on top of the left frame bar 11 and the right frame bar 12. On the right side and the left side of the cushion 41 are the right flap 43 and the left flap 45, respectively. On the end of the left flap 45 is positioned a left female fastener 46. On the end of the right flap 43 is positioned a right male fastener 44. The left flap 45 wraps around the left frame bar 11 and the right flap 43 wraps around the right frame bar 12. The right male fastener 44 is able to corresponds to and fasten to the left female fastener 46 to hold the protective cover 4 onto the back seat frame 1. The right male fastener 44 and the left female fastener 46 can be any type of fasteners including Velcro, buttons, snap fasteners, clips or ties. However, in the preferred embodiment of the present invention, the right male fastener 44 and the left female fastener 46 are Velcro.

Although the invention has been explained in relation to its preferred embodiment, it is to be understood that many other possible modifications and variations can be made without departing from the spirit and scope of the invention as hereinafter claimed.

What is claimed is:

1. A motorcycle backrest with extension signal lights comprises,
    a back seat frame;
    a left signal strip;
    a right signal strip;
    a protective cover;
    the back seat frame comprises of a left frame bar, a right frame bar, center cross bar, a circle frame bar, a left mount, a right mount, and at least one mount fastener;
    the left frame bar having a left hollow interior;
    the right frame bar having a right hollow interior;
    the left signal strip comprises of at least one left LED, a left signal connecting wire, and a left signal fastener;
    the right signal strip comprises at least one right LED, a right signal connecting wire, and a right signal fastener;
    the protective cover comprises a cushion, an insert cushion, a right flap, a right male fastener, left flap, and a left female fastener;

the left frame bar comprises a left mount slot, a milled left signal slot, and a left bar angled end;
the left frame bar having a left first end and a left second end;
the right frame bar comprises a right mount slot, a milled right signal slot, and a right bar angled end;
the right frame bar having a right first end and a right second end;
the left bar angled end being positioned on the left first end;
the right bar angled end being positioned on the right first end;
the left frame bar being connected to the right frame bar at the left bar angled end to the right bar angled end;
the left bar angled end being connected to the right bar angled end to form a pointed tip;
the circle frame bar being connected to the left frame bar and the right frame bar adjacent to the pointed tip;
the center cross bar being connected to the left frame bar and the right frame bar forming an a-shaped frame; and
the left frame bar and the right frame bar being positioned in between the circle frame bar and the center cross bar.

2. The motorcycle backrest with extension signal lights as claimed in claim 1 comprises,
the left mount slot being a positioned on the left second end;
the right mount slot being positioned on the right second end;
the left mount being inserted and welded into the left mount slot;
the right mount being inserted and welded into the right mount slot;
the left mount slot comprises at least one left mount hole;
the right mount slot comprises at least one right mount hole; and
the at least one mount fastener being inserted through the at least one left mount hole and the at least one right mount hole.

3. The motorcycle backrest with extension signal lights as claimed in claim 1 comprises,
the milled left signal slot being a first indented length positioned on and arranged in parallel relationship with the left frame bar;
the milled left signal slot being adjacent to the circle frame bar;
the milled right signal slot being a second indented length positioned on and arranged in parallel relationship with the right frame bar;
the milled right signal slot being adjacent to the circle frame bar;
the left signal strip being inserted in and positioned in parallel relationship with the milled left signal slot; and
the right signal strip being inserted in and positioned in parallel relationship with the milled right signal slot.

4. The motorcycle backrest with extension signal lights as claimed in claim 3 comprises,
the left signal strip being fastened and stabilized by the left signal fastener;
the right signal strip being fastened and stabilized by the right signal fastener;
the milled left signal slot having a left connector hole leading into the left hollow interior;
the milled right signal slot having a right connector hole leading into the right hollow interior;
the left second end having a left hole leading into the left hollow interior;
the right second end having a right hole leading into the right hollow interior;
the left signal connecting wire being connected to the left signal strip;
the right signal connecting wire being connected to the right signal strip;
the left signal connecting wire being inserted into the left hollow interior through the left connector hole and protruding out the left hole; and
the right signal connecting wire being inserted into the right hollow interior through the right connector hole and protruding out the right hole.

5. The motorcycle backrest with extension signal lights as claimed in claim 1 comprises,
the insert cushion being connected to the cushion;
the cushion being connected to the protective cover;
the cushion having a right side and a left side;
the right flap being positioned adjacent to cushion on the right side;
the left flap being positioned adjacent to the cushion on the left side;
the right male fastener being connected to the right flap; and
the left female fastener being connected to the left flap.

6. The motorcycle backrest with extension signal lights as claimed in claim 5 comprises,
the insert cushion being inserted between the left frame bar and the right frame bar;
the cushion being positioned across the left frame bar and the right frame bar;
the left flap being wrapped about the left frame bar;
the right flap being wrapped about the right frame bar;
the right male fastener fastens to the left female fastener to stabilize the protective cover to the left frame bar and the right frame bar; and
the right male fastener and the left female fastener being a fastener selected from the group consisting of buttons, snap fasteners, clips, or ties.

7. A motorcycle backrest with extension signal lights comprises,
a back seat frame;
a left signal strip;
a right signal strip;
a protective cover;
the back seat frame comprises of a left frame bar, a right frame bar, center cross bar, a circle frame bar, a left mount, a right mount, and at least one mount fastener;
the left frame bar having a left hollow interior;
the right frame bar having a right hollow interior;
the left signal strip comprises of at least one left LED, a left signal connecting wire, and a left signal fastener;
the right signal strip comprises at least one right LED, a right signal connecting wire, and a right signal fastener;
the protective cover comprises a cushion, an insert cushion, a right flap, a right male fastener, left flap, and a left female fastener;
the left frame bar comprises a left mount slot, a milled left signal slot, and a left bar angled end;
the left frame bar having a left first end and a left second end;
the right frame bar comprises a right mount slot, a milled right signal slot, and a right bar angled end;
the right frame bar having a right first end and a right second end;
the left bar angled end being positioned on the left first end;
the right bar angled end being positioned on the right first end
the left frame bar being connected to the right frame bar at the left bar angled end to the right bar angled end;

the left bar angled end being connected to the right bar angled end to form a pointed tip;

the circle frame bar being connected to the left frame bar and the right frame bar adjacent to the pointed tip;

the center cross bar being connected to the left frame bar and the right frame bar forming an a-shaped frame; and the left frame bar and the right frame bar being positioned in between the circle frame bar and the center cross bar.

8. The motorcycle backrest with extension signal lights as claimed in claim 7 comprises, the left mount slot being a positioned on the left second end;

the right mount slot being positioned on the right second end;

the left mount being inserted and welded into the left mount slot;

the right mount being inserted and welded into the right mount slot;

the left mount slot comprises at least one left mount hole;

the right mount slot comprises at least one right mount hole; and the at least one mount fastener being inserted through the at least one left mount hole and the at least one right mount hole.

9. The motorcycle backrest with extension signal lights as claimed in claim 7 comprises, the milled left signal slot being a first indented length positioned on and arranged in parallel relationship with the left frame bar;

the milled left signal slot being adjacent to the circle frame bar;

the milled right signal slot being a second indented length positioned on and arranged in parallel relationship with the right frame bar;

the milled right signal slot being adjacent to the circle frame bar;

the left signal strip being inserted in and positioned in parallel relationship with the milled left signal slot;

the right signal strip being inserted in and positioned in parallel relationship with the milled right signal slot;

the left signal strip being fastened and stabilized by the left signal fastener;

the right signal strip being fastened and stabilized by the right signal fastener;

the milled left signal slot having a left connector hole leading into the left hollow interior;

the milled right signal slot having a right connector hole leading into the right hollow interior;

the left second end having a left hole leading into the left hollow interior; and the right second end having a right hole leading into the right hollow interior.

10. The motorcycle backrest with extension signal lights as claimed in claim 9 comprises, the left signal connecting wire being connected to the left signal strip;

the right signal connecting wire being connected to the right signal strip;

the left signal connecting wire being inserted into the left hollow interior through the left connector hole and protruding out the left hole; and the right signal connecting wire being inserted into the right hollow interior through the right connector hole and protruding out the right hole.

11. The motorcycle backrest with extension signal lights as claimed in claim 7 comprises, the insert cushion being connected to the cushion;

the cushion being connected to the protective cover;

the cushion having a right side and a left side;

the right flap being positioned adjacent to cushion on the right side;

the left flap being positioned adjacent to the cushion on the left side;

the right male fastener being connected to the right flap; and the left female fastener being connected to the left flap.

12. The motorcycle backrest with extension signal lights as claimed in claim 11 comprises, the insert cushion being inserted between the left frame bar and the right frame bar;

the cushion being positioned across the left frame bar and the right frame bar;

the left flap being wrapped about the left frame bar;

the right flap being wrapped about the right frame bar;

the right male fastener fastens to the left female fastener to stabilize the protective cover to the left frame bar and the right frame bar; and the right male fastener and the left female fastener being a fastener selected from the group consisting of buttons, snap fasteners, clips, or ties.

13. A motorcycle backrest with extension signal lights comprises, a back seat frame;

a left signal strip;

a right signal strip;

a protective cover;

the back seat frame comprises of a left frame bar, a right frame bar, center cross bar, a circle frame bar, a left mount, a right mount, and at least one mount fastener;

the left frame bar having a left hollow interior;

the right frame bar having a right hollow interior;

the left signal strip comprises of at least one left LED, a left signal connecting wire, and a left signal fastener;

the right signal strip comprises at least one right LED, a right signal connecting wire, and a right signal fastener;

the protective cover comprises a cushion, an insert cushion, a right flap, a right male fastener, left flap, and a left female fastener;

the left frame bar comprises a left mount slot, a milled left signal slot, and a left bar angled end;

the left frame bar having a left first end and a left second end;

the right frame bar comprises a right mount slot, a milled right signal slot, and a right bar angled end;

the right frame bar having a right first end and a right second end;

the left bar angled end being positioned on the left first end;

the right bar angled end being positioned on the right first end;

the left frame bar being connected to the right frame bar at the left bar angled end to the right bar angled end;

the left bar angled end being connected to the right bar angled end to form a pointed tip;

the circle frame bar being connected to the left frame bar and the right frame bar adjacent to the pointed tip;

the center cross bar being connected to the left frame bar and the right frame bar forming an a-shaped frame;

the left frame bar and the right frame bar being positioned in between the circle frame bar and the center cross bar;

the milled left signal slot being a first indented length positioned on and arranged in parallel relationship with the left frame bar;

the milled left signal slot being adjacent to the circle frame bar;

the milled right signal slot being a second indented length positioned on and arranged in parallel relationship with the right frame bar;

the milled right signal slot being adjacent to the circle frame bar;

the left signal strip being inserted in and positioned in parallel relationship with the milled left signal slot; and the right signal strip being inserted in and positioned in parallel relationship with the milled right signal slot.

14. The motorcycle backrest with extension signal lights as claimed in claim 13 comprises, the left mount slot being a positioned on the left second end;

the right mount slot being positioned on the right second end;

the left mount being inserted and welded into the left mount slot;

the right mount being inserted and welded into the right mount slot;

the left mount slot comprises at least one left mount hole;

the right mount slot comprises at least one right mount hole; and the at least one mount fastener being inserted through the at least one left mount hole and the at least one right mount hole.

15. The motorcycle backrest with extension signal lights as claimed in claim 13 comprises, the left signal strip being fastened and stabilized by the left signal fastener;

the right signal strip being fastened and stabilized by the right signal fastener;

the milled left signal slot having a left connector hole leading into the left hollow interior;

the milled right signal slot having a right connector hole leading into the right hollow interior;

the left second end having a left hole leading into the left hollow interior; and the right second end having a right hole leading into the right hollow interior.

16. The motorcycle backrest with extension signal lights as claimed in claim 15 comprises, the left signal connecting wire being connected to the left signal strip;

the right signal connecting wire being connected to the right signal strip;

the left signal connecting wire being inserted into the left hollow interior through the left connector hole and protruding out the left hole; and the right signal connecting wire being inserted into the right hollow interior through the right connector hole and protruding out the right hole.

17. The motorcycle backrest with extension signal lights as claimed in claim 13 comprises, the insert cushion being connected to the cushion;

the cushion being connected to the protective cover;

the cushion having a right side and a left side;

the right flap being positioned adjacent to cushion on the right side;

the left flap being positioned adjacent to the cushion on the left side;

the right male fastener being connected to the right flap; and the left female fastener being connected to the left flap.

18. The motorcycle backrest with extension signal lights as claimed in claim 17 comprises, the insert cushion being inserted between the left frame bar and the right frame bar;

the cushion being positioned across the left frame bar and the right frame bar;

the left flap being wrapped about the left frame bar;

the right flap being wrapped about the right frame bar;

the right male fastener fastens to the left female fastener to stabilize the protective cover to the left frame bar and the right frame bar; and the right male fastener and the left female fastener being a fastener selected from the group consisting of buttons, snap fasteners, clips, or ties.

* * * * *